US011635112B2

(12) United States Patent
Seminel

(10) Patent No.: US 11,635,112 B2
(45) Date of Patent: Apr. 25, 2023

(54) TORQUE LIMITER

(71) Applicant: Ratier-Figeac SAS, Figeac (FR)

(72) Inventor: Bruno Seminel, Lot (FR)

(73) Assignee: RATIER-FIGEAC SAS, Figeac (FR)

( * ) Notice: Subject to any disclaimer, the term of this patent is extended or adjusted under 35 U.S.C. 154(b) by 98 days.

(21) Appl. No.: 17/124,706

(22) Filed: Dec. 17, 2020

(65) Prior Publication Data

US 2021/0254674 A1 Aug. 19, 2021

(30) Foreign Application Priority Data

Feb. 17, 2020 (EP) ..................................... 20290014

(51) Int. Cl.
*F16D 27/112* (2006.01)
*F16D 27/00* (2006.01)

(52) U.S. Cl.
CPC ...... *F16D 27/112* (2013.01); *F16D 2027/007* (2013.01); *F16D 2300/18* (2013.01); *F16D 2500/1022* (2013.01); *F16D 2500/1045* (2013.01); *F16D 2500/10406* (2013.01); *F16D 2500/30406* (2013.01); *F16D 2500/30407* (2013.01); *F16D 2500/30415* (2013.01); *F16D 2500/30426* (2013.01); *F16D 2500/50287* (2013.01); *F16D 2500/70418* (2013.01)

(58) Field of Classification Search
None
See application file for complete search history.

(56) References Cited

U.S. PATENT DOCUMENTS 3,055,475 A * 9/1962 Pitts, Jr. ................ F16D 27/112
192/84.961
4,079,821 A 3/1978 Miller
(Continued)

FOREIGN PATENT DOCUMENTS

CN 2599311 Y 1/2004
EP 1985881 A2 * 10/2008 ............ F16D 27/112
(Continued)

OTHER PUBLICATIONS

KR101479680B1 translation (Year: 2015).*
European Search Report for Application No. 20290014.8, dated Jul. 29, 2020, 7 pages.

*Primary Examiner* — Timothy Hannon
(74) *Attorney, Agent, or Firm* — Cantor Colburn LLP

(57) ABSTRACT

A torque limiter device includes an input shaft having a first contact surface and an output shaft having a second contact surface. The input and output shafts are operable in an engaged position wherein the contact surfaces are brought into mechanical engagement, and a disengaged position wherein the contact surfaces are separated. A biasing mechanism provides a bias force that mechanically biases the input and output shafts in one of the positions and sets a threshold torque. An electromagnet is arranged to selectively provide an electromagnetic force that opposes the bias force when an activation current is supplied. A rotation sensor arrangement measures a respective rotation of the input shaft and of the output shaft. A controller determines a difference in rotations of the shafts and selectively supply the activation current to the electromagnet so as to disengage the input and output shafts when the rotation difference exceeds a threshold.

19 Claims, 5 Drawing Sheets

(56) References Cited

U.S. PATENT DOCUMENTS

| | | | | |
|---|---|---|---|---|
| 4,896,757 A | * | 1/1990 | Seager, Sr. | F16D 27/112 |
| | | | | 123/41.12 |
| 5,030,942 A | * | 7/1991 | Langen | F16D 7/025 |
| | | | | 340/684 |
| 5,862,902 A | * | 1/1999 | Howrie | F16D 27/14 |
| | | | | 192/84.961 |
| 6,101,897 A | * | 8/2000 | Showalter | F16D 27/115 |
| | | | | 74/665 GE |
| 6,132,332 A | | 10/2000 | Yasui | |
| 7,534,193 B2 | | 5/2009 | Baxter, Jr. et al. | |
| 7,677,376 B2 | | 3/2010 | Schachtl et al. | |
| 8,534,439 B2 | | 9/2013 | Gilmore | |
| 2009/0321213 A1 | * | 12/2009 | Geiger | F16D 27/14 |
| | | | | 192/84.31 |
| 2010/0078288 A1 | * | 4/2010 | Heinrich | F16H 59/38 |
| | | | | 192/220 |
| 2011/0176939 A1 | * | 7/2011 | Pasta | F02B 67/06 |
| | | | | 474/166 |
| 2017/0335899 A1 | | 11/2017 | Mellor | |
| 2018/0251228 A1 | * | 9/2018 | Sands | B64D 27/02 |
| 2020/0025258 A1 | * | 1/2020 | Schmitz | F16D 7/025 |
| 2021/0086890 A1 | * | 3/2021 | McKay | B64C 9/24 |

FOREIGN PATENT DOCUMENTS

| | | | | |
|---|---|---|---|---|
| KR | 101479680 B1 | * | 1/2015 | F16D 27/112 |
| WO | 2018177634 A1 | | 10/2018 | |

\* cited by examiner

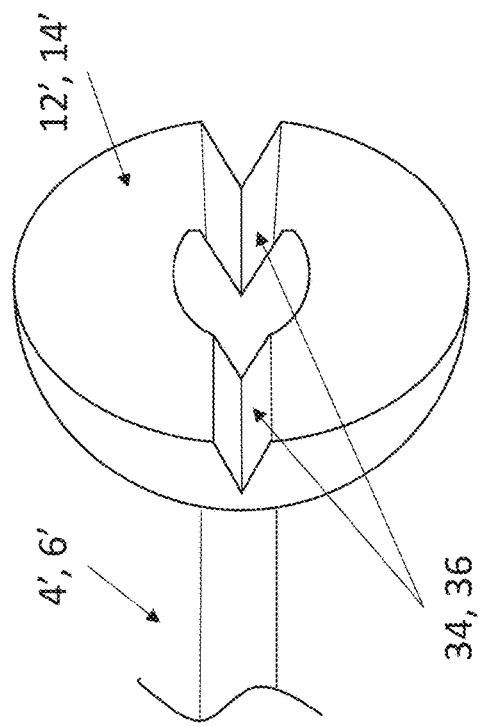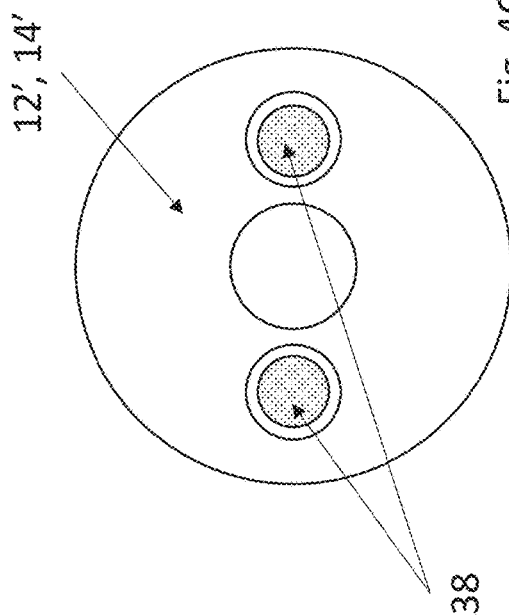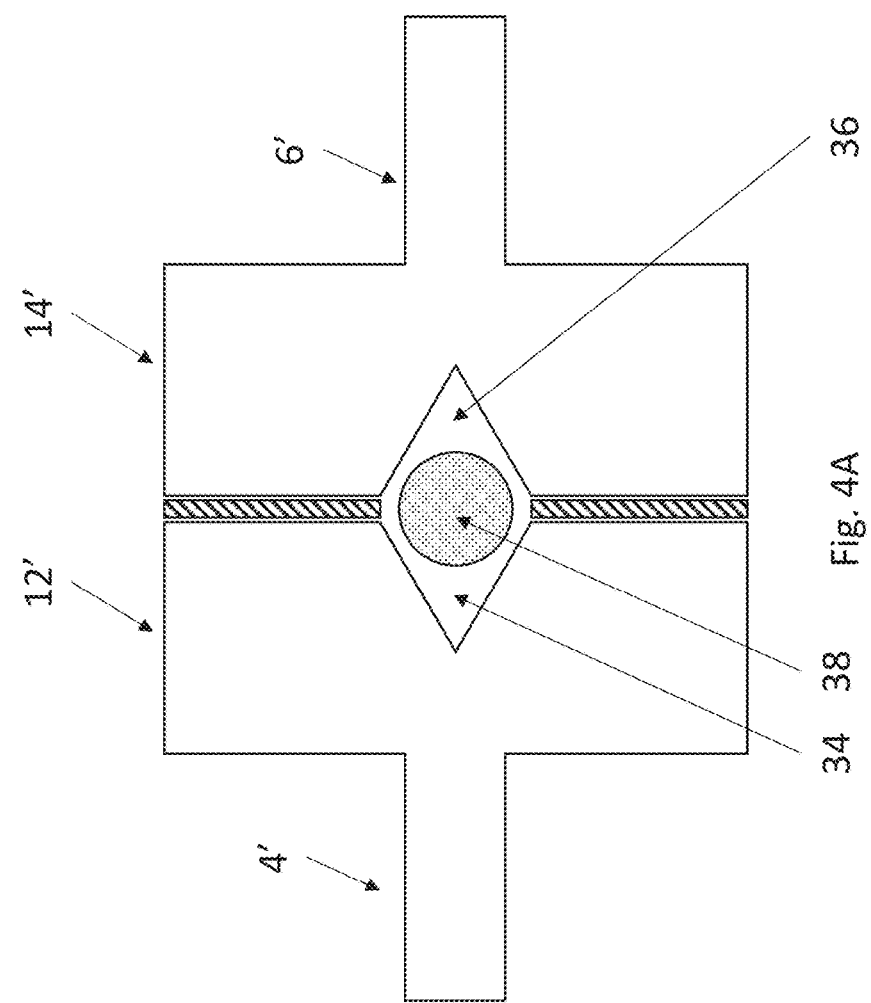

TORQUE LIMITER

FOREIGN PRIORITY

This application claims priority to European Patent Application No. 20290014.8 filed Feb. 17, 2020, the entire contents of which is incorporated herein by reference.

TECHNICAL FIELD

This disclosure relates to a torque limiter device, in particular a 'declutchable torque limiter' for selectively engaging and disengaging first and second shafts. Such a torque limiter device may be particular applicable, but is not limited to, aerospace applications.

BACKGROUND ART

In many applications, including but not limited to aerospace applications, it is desirable to provide selective power transmission from a driving (or 'input') shaft to a driven (or 'output') shaft. For example, a motor may be arranged to drive the input shaft (i.e. to cause it to rotate around its major axis), where this rotation is to be transmitted to a further shaft—i.e. the output shaft—which does not itself have a direct connection to the motor. A clutch mechanism provides a means to selectively engage and disengage the shafts, i.e. to bring them into or out of physical communication respectively, in order to allow or prevent power transmission.

Generally, clutch mechanism arrangements vary a distance between the contact surfaces of the shafts to selectively enable power transmission. For example, the contact surface of the output shaft may be moved axially along its axis of rotation to bring it in and out of contact with the contact surface of the input shaft. There are a number of different clutch mechanisms known in the art per se. For example, a friction clutch operates by bringing opposing faces of the two shafts into physical contact, either directly or via an intervening friction plate. Due to the frictional contact between the faces when in contact with one another, rotation of one shaft imparts rotation of the other shaft. Another type of clutch is a 'ball and ramp' clutch, where a surface of one shaft is provided with a number of ball-like protrusions that engage with a number of corresponding ramp-like grooves on the opposing surface of the other shaft. Again, the mechanical engagement between the shafts when in contact causes rotation of one shaft to drive rotation of the other shaft.

An issue with such arrangements is that the contact surfaces of the shafts can experience excessive torque when one of the shafts rotates at a different speed to the other. This can occur, for example, if there is a jam or blockage downstream of the output shaft. This may cause a rapid deceleration of the output shaft which, in turn, could cause a large 'over-torque' on the input shaft and upstream components because of inertial loading from upstream components, e.g. the motor itself and/or the gear train.

Damage of upstream components is undesirable in many applications, but it is particularly important to avoid issues arising from excess torque in aerospace applications. In particular, this is an important consideration in thrust reversal actuation systems (TRAS) and high-lift systems, both of which are aerospace systems known in the art per se. In brief, a TRAS provides a mechanism through which thrust may be switched from a forward configuration (i.e. the configuration used to drive the aircraft forwards) and a reverse configuration (e.g. to provide for braking to reduce runway stopping distance). A high-lift system provides a mechanism on the wing of the aircraft that increases lift, for example by actuating flaps and/or slats on the wing. Other applications include primary and secondary flight control actuations systems.

It is therefore an aim of the present disclosure to protect mechanical components connected to a clutch mechanism from excessive torques, e.g. torques caused by a jam downstream of the clutch.

SUMMARY OF THE DISCLOSURE

In accordance with a first aspect, the present disclosure provides a torque limiter device comprising of an input shaft arranged to be driven by an externally applied torque such that it rotates around a first axis, said input shaft comprising a first contact surface; an output shaft rotatable around a second axis, wherein the second axis is substantially coaxial with the first axis, said output shaft comprising a second contact surface that faces the first contact surface, and wherein the input and output shafts are operable in an engaged position wherein the first and second contact surfaces are brought into mechanical engagement, and a disengaged position wherein the first and second contact surfaces are separated; a biasing mechanism arranged to provide a bias force that biases the input and output shafts in one of the positions; an electromagnet arranged to provide an electromagnetic force that opposes said bias force when an activation current is passed through a coil of said electromagnet, thereby operating the input and output shafts in the other of said positions; a rotation sensor arrangement arranged to measure a rotation of the input shaft and a rotation of the output shaft; and a controller arranged to determine a difference between the rotation of the input shaft and the rotation of the output shaft, said controller being further arranged to selectively supply the activation current to the coil of the electromagnet such that the input and output shafts are operated in the disengaged position when the difference exceeds a threshold.

Thus, it will be appreciated that aspects of the present disclosure provide a torque limiter device (i.e. a torque-limited clutch arrangement) in which excess torque causes slippage (i.e. a difference in rotation speed between the input and output shafts). This slippage may be detected and, when a sufficiently significant degree of slippage is detected (as set through suitable selection of the threshold to which the rotation difference is compared), the input and output shafts are driven apart into the disengaged position. As soon as any significant 'sliding' between the input and output shafts is detected, the current in the electromagnet is switched so as to drive the shafts to the disengaged position.

In general, the torque (T) that can be transmitted is a function of the biasing force between the contact surfaces (F), the contact surface average radius (R), and the coefficient of friction (f): $T = F \times R \times f$. Thus the biasing portion may advantageously allow for control of the 'slipping torque' setting. Specifically, the slipping torque is dependent on the biasing force supplied by the biasing portion. In other words, the biasing portion determines the torque threshold which, once exceeded, causes slippage. When sufficiently large slippage is detected, the controller causes disengagement of the input and output shafts, preventing transmission of power substantially immediately.

Such an arrangement may be particularly advantageous in aerospace applications, such as in TRAS and/or high-lift systems. The ability to rapidly disengage the output shaft from the input shaft in response to a large torque (which causes slippage in the mechanism disclosed herein) between the shafts is particularly beneficial in order to protect 'upstream' components (i.e. components upstream of the input shaft) in response to a jam (e.g. downstream of the output shaft).

In some examples the first and second contact surfaces are brought into direct contact in the engaged position. However, in some other examples, the clutch mechanism further comprises a friction plate having first and second friction plate surfaces on opposite sides thereof, wherein the first and second contact surfaces are brought into contact with the first and second friction plate surfaces respectively in the engaged position, e.g. under a controlled biasing force. This friction plate may, by way of example only, be made of or coated with carbon. For example, some contact surfaces (e.g. a flange at the end of each shaft) may typically made of steel and may, by way of non-limiting example only, be hardened locally with carburizing, induction hardening or nitriding. Where provided, a friction plate (sometimes referred to as a 'friction disk' or 'friction disc') may be made of materials that are typically used for brake pads (i.e. for automotive use, e.g. car brake pads), e.g. sintered materials, carbon-carbon (A/C brakes), etc.

The clutch assembly may therefore rely on 'contact friction' between the contact surfaces in the engaged position in order for the input shaft to transmit torque to the output shaft. However, in a set of examples one of the contact surfaces comprises one or more protrusions and the other of the contact surfaces comprises one or more grooves, wherein the protrusions are arranged to mechanically engage the grooves in the engaged position. These protrusions may be 'ball-like', i.e. they may have a convex structure, while the grooves may be 'ramp-like', i.e. they may have a concave structure.

In an alternative set of examples, each of the contact surfaces comprises one or more grooves, wherein at least one rotatable member is disposed in at least one of said grooves, wherein in the engaged position, the rotatable member mechanically engages a respective groove on each of the contact surfaces. In some such examples, each groove on one contact surface corresponds to a matching groove on the other contact surface, wherein there is at least one rotating member per matched pair of grooves. These grooves may be 'ramp-like'. Thus the clutch mechanism may use a 'ball-and-ramp' mechanism in order to provide for power transmission. It will be appreciated that, compared to a contact friction arrangement, such a ball-and-ramp arrangement may require that the contact surfaces are moved apart by a greater distance in order for the shafts to disengage, where the distance is set by the height of the protrusions.

The rotating member(s) may, in some examples, comprise a ball or a roller. Thus, in such examples, the balls (or rollers, or some other rotatable member) can freely rotate within the groove(s), producing less friction than 'sliding' type engagements such as the mechanism described above.

With a contact friction mechanism, the distance between the contact surfaces required for disengagement may be minimal, e.g. it may be on the scale of tenths of a millimetre. Providing the distance between the contact surfaces required in order to achieve disengagement is relatively small (for example approximately 1-2 mm), the electromagnetic force produced by the electromagnet when the activation current is passed through the coil may be sufficient to cause the switching between operating positions alone. However, in some examples, the electromagnet may be arranged to move a mechanical fork, wherein movement of said fork drives the input and output shafts between the engaged and disengaged positions. This may be advantageous in arrangements where greater distances are required for disengagement of the contact surfaces, as it may permit use of a smaller electromagnet than would be necessary were the electromagnet required to move the contact surfaces apart alone. This may be particularly beneficial for ball-and-ramp clutch mechanisms such as those outlined above, but may also be useful for contact friction mechanisms.

In order to allow switching between the engaged and disengaged positions, at least one of the contact surfaces may be moveable along the axis of its respective shaft, thereby providing movement between the engaged and disengaged positions. However, in a set of examples, the second contact surface is axially moveable along the second axis, thereby providing movement between the engaged and disengaged positions. Thus, in a set of examples, the first contact surface is static in the axial direction (i.e. it does not move along the first axis), but the second contact surface is moveable in the axial direction (i.e. it can move along the second axis). Generally, axially moving the contact surface of the output shaft leads to a simpler design than axially moving the contact surface of the input shaft. For example, as the electromagnetic coil is not rotating either, there is no relative rotation between the coil and the output shaft when in the disengaged position and thus these can be in direct contact, potentially leading to a simpler design.

It will be appreciated that the principles of the present invention apply regardless of whether the 'normal' position (i.e. when no, or at least insufficient, current flows through the coil of the electromagnet) is the engaged position or the disengaged position. The biasing mechanism may comprise any suitable means for biasing the shafts to the appropriate position. In some examples, the biasing mechanism comprises a resilient member, wherein the bias force is supplied by said resilient member. In some examples, the resilient member comprises a spring, e.g. a coil spring. In some examples, the spring comprises a Belleville washer. In some examples, the biasing portion may include a plurality of resilient members (e.g. springs such as Belleville washers). Those skilled in the art will appreciate that a Belleville washer (sometimes referred to as a 'coned-disc soring, conical spring washer, disc spring, Belleville spring, or cupped spring washer) is a washer having a substantially frusto-conical shape that provides the washer with spring-like behaviour.

In some examples, the bias portion further comprises a variable preload portion arranged to vary the threshold. By changing the preload force of the bias portion, the threshold slippage torque at which the clutch mechanism switches to the disengaged position can be set as per the $T = F \times R \times f$ relationship outlined hereinabove.

In a set of examples, the bias force biases the input and output shafts to the engaged position, wherein the electromagnetic force that opposes the bias force when an activation current is passed through a coil of said electromagnet operates the input and output shafts in the disengaged position. In such examples, the clutch is 'normally engaged', i.e. in the absence of the activation current, the input and output shafts are in mechanical engagement such that power transmission occurs. In such examples, the clutch 'fails closed', so that in the event of power loss to the electromagnet, the input shaft is able to continue to transmit power to the output shaft unimpeded, assuming no further mechanism prevents the power transmission.

However, in an alternative set of examples, the bias force biases the input and output shafts to the disengaged position, wherein the electromagnetic force that opposes the bias force when an activation current is passed through a coil of said electromagnet operates the input and output shafts in the engaged position. Thus in accordance with such examples, the clutch is 'normally disengaged', i.e. in the absence of the activation current, the input and output shafts are physically separated such that power transmission is prevented. Accordingly, the clutch 'fails open', so that in the event of power loss to the electromagnet, the input shaft is unable to transmit power to the output shaft.

In some examples, the rotation sensor arrangement determines a difference between a rotation frequency of the input shaft and a rotation frequency of the output shaft. The rotation frequency corresponds to the rotation speed (i.e. the angular rate) of the shaft. Under normal operation, the respective speeds of the input and output shafts should be substantially equal. If these speeds are not equal, there will be a difference in the rotation frequencies of the shafts. If this frequency difference is sufficiently large, this may indicate slippage between the shafts, e.g. due to a downstream jam.

The rotation sensor arrangement may receive signals from rotation sensors external to the torque limiter device, for example speed sensors located in e.g. a motor, a reverser panel hinge, etc. However, in some examples the rotation sensor arrangement comprises at least one rotation sensor (i.e. the rotation speed is detected internally of the torque limiter device). In some examples, the rotation sensor arrangement comprises a first rotation sensor arranged to determine the rotation frequency of the input shaft, and a second rotation sensor arranged to determine the rotation frequency of the output shaft.

In some potentially overlapping examples, the rotation sensor arrangement determines a difference between a rotation phase of the input shaft and a rotation phase of the output shaft. In a set of such examples, the rotation sensor arrangement determines a rate of change of the difference between a rotation phase of the input shaft and a rotation phase of the output shaft. Those skilled in the art will appreciate that provided that the rotation speeds of the input and output shafts are equal, the relative phase between their rotations will remain constant. However, if the relative phase changes, or changes over time (i.e. there is a phase drift), this may indicate slipping.

There are a number of rotation sensors that may be used to provide suitable measurements of the rotation of the input and output shafts such that a difference between these can be determined, thereby providing a measure of slippage. However, in some examples, at least one of the input and output shafts comprises a toothed arrangement, wherein the rotation sensor arrangement detects a motion of the toothed arrangement to determine the rotation of the shaft. In some examples, both shafts comprise a respective toothed arrangement. Where only one shaft comprises a toothed arrangement, this will typically be the shaft that stops when slippage is detected, which in a set of examples is the output shaft.

In a set of such examples, the rotation sensor comprises a Hall effect sensor arranged to determine the rotation of the toothed arrangement. Where multiple rotation sensors are provided, each of these may comprise a respective Hall effect sensor. Those skilled in the art will appreciate that a Hall effect sensor detects a magnetic field proximate to the sensor and thus, with suitable selection of material of the toothed arrangement (e.g. a ferromagnetic metal material), the teeth of the toothed arrangement will cause a variation in the magnetic field proximate to the Hall effect sensor, where the variation in magnetic field provides a measure of the rotation of the corresponding shaft. The frequency of the variation may provide a measure of the rotation speed while the phase of the variation may be used to determine a phase difference between the two shafts as outlined above. Such an arrangement forms a 'phonic wheel', where the rotation speed may be determined, for example, by utilising prior knowledge of the number and spacing of the teeth. Where two Hall effect-based rotation sensors are provided, each may be arranged to observe motion of a respective toothed arrangement on the corresponding shaft.

Additionally or alternatively, the rotation sensor may comprise an optical sensor. Such an optical sensor may determine the rotation of the shafts, e.g. by optically detecting motion of a toothed arrangement or an optical marking on the shaft.

The first aspect of the present disclosure extends to a thrust reversal actuation system or high-lift system comprising a torque limiter device in accordance with any of the examples of the present disclosure outlined hereinabove.

When viewed from a second aspect, examples of the present disclosure provide a method of operating a torque limiter device, the method comprising: monitoring a difference in rotation between an input shaft and an output shaft; selectively supplying current to an electromagnet, thereby moving one of the input shaft and the output shafts relative to the other against a biasing force; determining when the difference in rotation exceeds a threshold; and disengaging the input shaft from the output shaft when the difference in rotation exceeds the threshold.

The method of the second aspect may be applied to a torque limiter device, thrust reversal actuation system, or high-lift system in accordance with any examples of the first aspect of the disclosure outlined hereinabove.

BRIEF DESCRIPTION OF THE DRAWINGS

Certain examples of the present disclosure will now be described with reference to the accompanying drawings, in which:

FIGS. 4A-C are schematic diagrams of a ball-and-ramp interface; and

DETAILED DESCRIPTION

Figure 1:
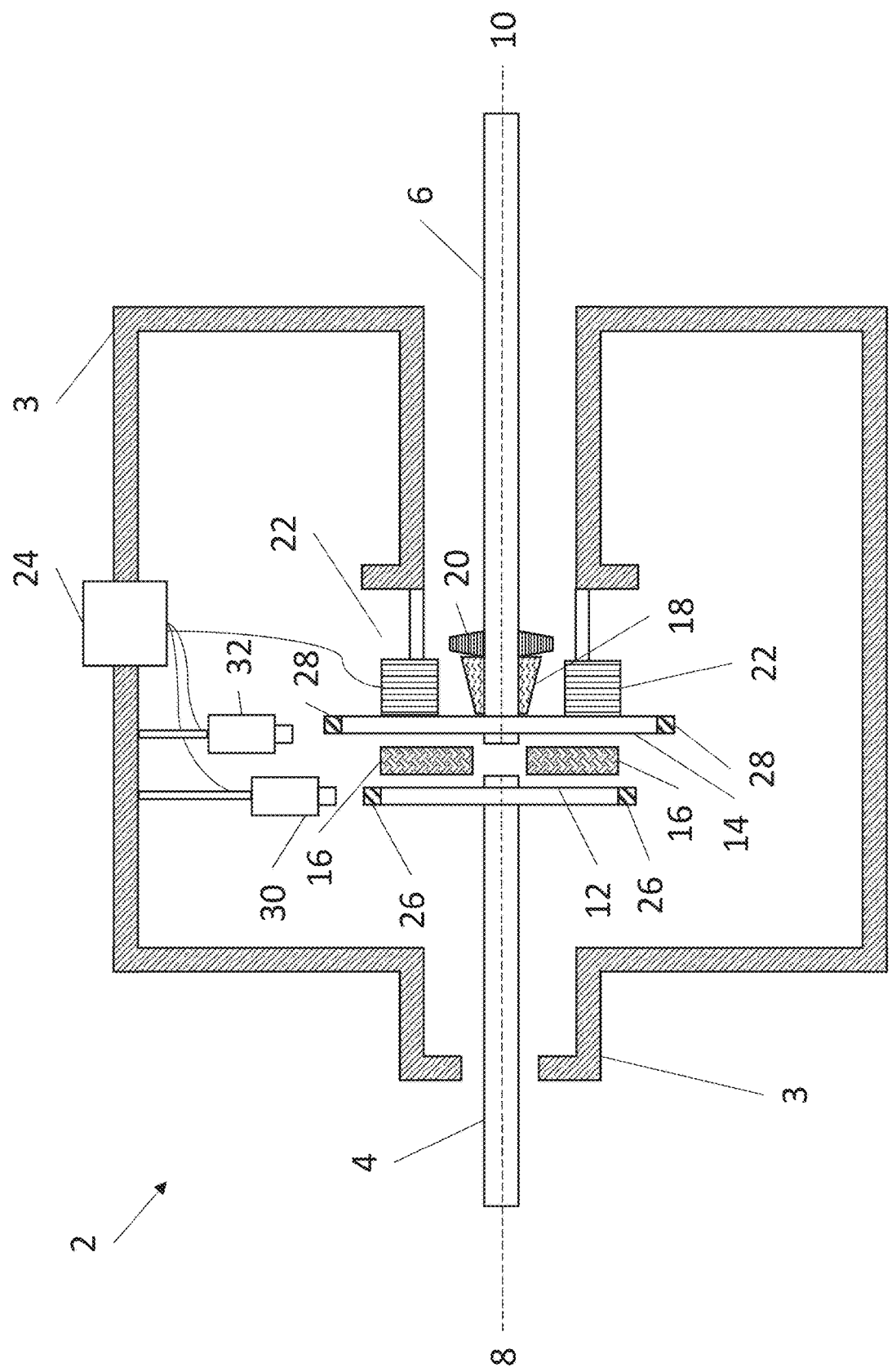
FIG. 1 is a schematic diagram of a torque limiter device in the disengaged position in accordance with an example of the present disclosure.
Figure 2:
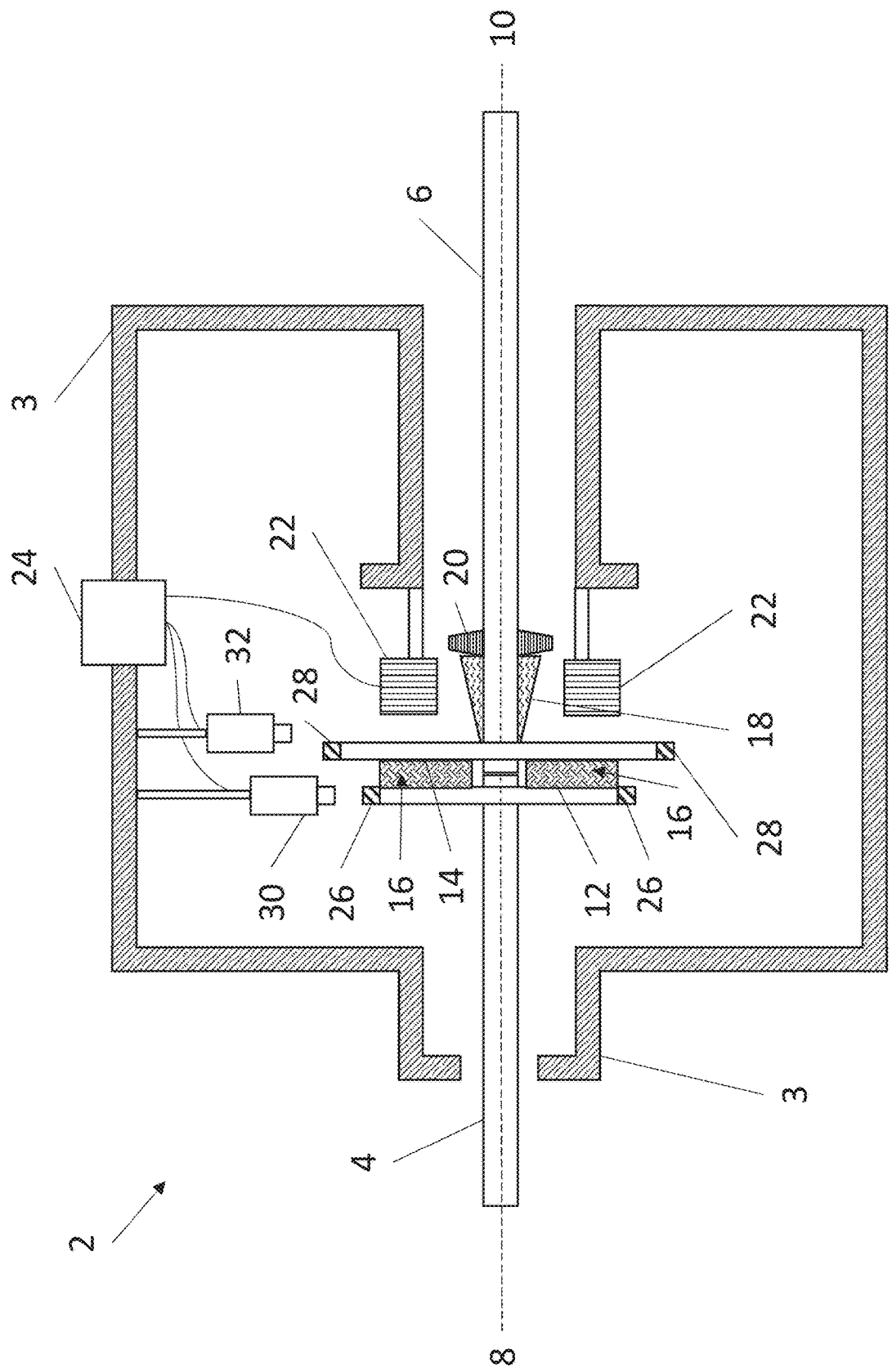
FIG. 2 is a schematic diagram of torque limiter device of FIG. 1 in the engaged position.

FIG. 1 is a schematic diagram of a torque limiter device 2 in the disengaged position in accordance with an example of the present disclosure. FIG. 2 is a schematic diagram of a torque limiter device 2 of FIG. 1 in the engaged position. The clutch mechanism 2 is positioned within a housing 3 that does not itself rotate.

The torque limiter device 2 of FIGS. 1 and 2 comprises an input shaft 4 and an output shaft 6. The input shaft 4 is a 'driving' shaft and is arranged to be connected to a motor (not shown) or some other suitable driving means that imparts an externally applied torque on the input shaft 4, thereby causing it to rotate about its major axis 8. It will be appreciated that the 'major axis' of a shaft is along the axial direction, with the shaft considered a cylinder.

The output shaft 6 is a 'driven' shaft, and rotates about its major axis 10 in response to a torque transferred from the input shaft 4 when in the engaged position, as outlined in further detail below with reference to FIG. 2. The shafts 4, 6 are coaxial with one another, i.e. their axes 8, 10 coincide. In the disengaged position, there is a gap between the contact surfaces 12, 14 as shown in FIG. 1 such that no such torque is transferred, thereby preventing power transmission.

In the engaged position, a contact surface 12 of the input shaft 4 is brought into engagement with a contact surface 14 of the output shaft 6. While these contact surfaces 12, 14 could be brought directly into contact (which may involve providing the contact surfaces 12, 14 with suitable friction-enhancing coatings depending on the materials that the contact surfaces 12, 14 themselves are made from), in this example, a friction plate 16 is provided between the contact surfaces 12, 14.

This friction plate 16 is of a disc-like construction and has opposing faces that are brought into contact with the contact surfaces 12, 14 in the engaged position, as shown in FIG. 2.

A Belleville washer 18 is provided that, in this example, biases the second contact surface 14 (i.e. the contact surface of the output shaft 6) toward the contact surface 12 of the input shaft 4, and therefore into mechanical engagement with the friction plate 16, as shown in FIG. 2. This Belleville washer 18 therefore acts as a spring that applies a spring force that 'urges' the clutch into the engaged position in the absence of any sufficient opposing force.

A nut 20 is provided on the output shaft 6, where adjusting this nut 20 varies the 'preload' spring force applied on the second contact surface 14 by the Belleville washer 18. The torque (T) that can be transmitted is a function of the biasing force between both (F), the contact surface average radius (R) and the coefficient of friction (f): $T = F \times R \times f$.

Figure 3:
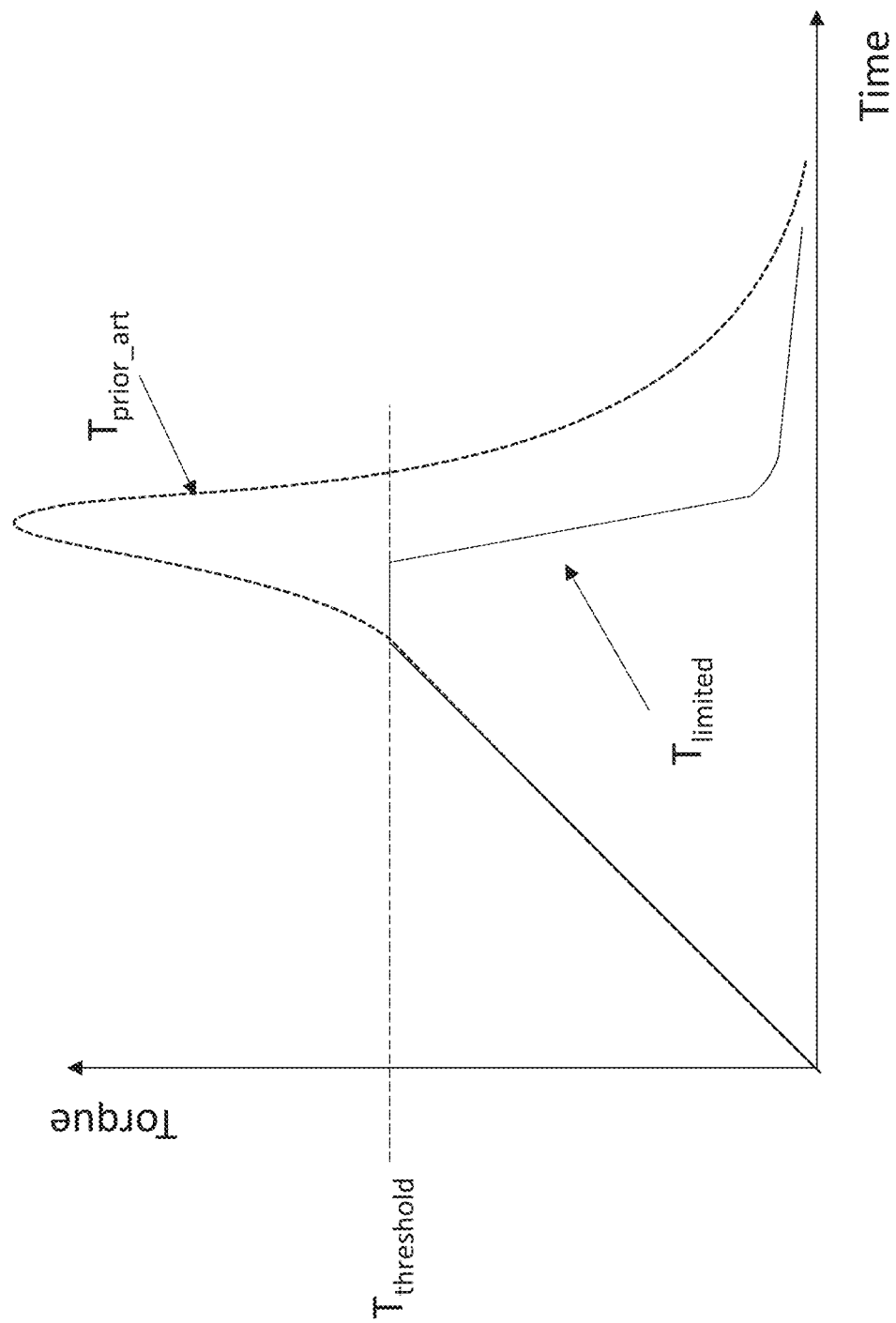
FIG. 3 is a graph shows the torque Tlimited of the device of FIG. 1 compared to a prior art device.

Thus with appropriate choice of force F from the biasing portion, a threshold torque Tthreshold may be set, as can be seen in the graph of FIG. 3, where this threshold torque Tthreshold corresponds to the 'slipping torque' setting of the device 2. Specifically, the graph of FIG. 3 shows plots of the torque Tlimited of the device 2 according to the example of the present disclosure and the torque Tprior_art associated with a device without the torque limiter.

In the disclosed device 2, when the torque exceeds the threshold torque Tthreshold, the input shaft 4 and output shaft 6 are immediately disengaged, leading to rapid reduction in torque and preventing transmission of power substantially immediately. Thus the torque is 'clipped' at the threshold value Tthreshold. This may help to prevent damage to other mechanical components that would occur as a result of the torque exceeding this value, as may occur with the prior art arrangement.

An electromagnet 22 is arranged to provide an electromagnetic force that opposes the bias force from the Belleville washer 18 when an activation current is passed through a coil of the electromagnet 22. This current is supplied by a controller 24, the details of which are described in further detail below. The electromagnet 22 does not rotate, and is typically fixed to the housing 3.

Each of the contact surfaces 12, 14 (or, more generally, the flange at the end of the shafts 4, 6, the ends of which form the contact surfaces 12, 14) is provided with a respective toothed arrangement 26, 28. These toothed arrangements 26, 28 are formed by etching grooves on the outer diameter of the contact surfaces 12, 14. A pair of rotation sensors 30, 32 are arranged in proximity to the toothed arrangements 26, 28. Specifically, the rotation sensors 30, 32 are Hall effect sensors, i.e. they detect variation in the 'ferromagnetic mass' in front of the sensor. These rotation sensors 30, 32 do not rotate, and are typically fixed to the housing 3.

As the contact surfaces 12, 14 rotate with their corresponding shafts 4, 6, the respective rotation sensors 30, 32 will detect fluctuations in the ferromagnetic mass in front of the sensor 30, 32 as they are alternately presented with portions of the outer diameters of the contact surfaces 12, 14 having different heights due to the toothed arrangements 26, 28 (i.e. depending on whether it is a grooved portion of the outer diameter or not). Each rotation sensor 30, 32 generates a respective signal that is fed to the controller 24.

The controller 24 determines whether slipping is occurring from a difference in rotation between the signals from the rotation sensors 30, 32. Slipping may be detected by comparing the respective frequencies of the signals from the rotation sensors 30, 32. The frequency of the signals from these sensors 30, 32 corresponds to the rotation speed (i.e. the angular rate) of the respective shaft 4, 6.

Under normal operation, the respective speeds of the input and output shafts 4, 6 should be substantially equal. However, if the speeds of these shafts 4, 6 are not equal, there will be a difference in the rotation frequencies of the shafts. If this frequency difference is sufficiently large, this may indicate slippage between the shafts, e.g. due to a downstream jam. The controller 24 compares the frequency difference to a threshold value. If the frequency difference exceeds the threshold, the controller 24 supplies an activation current to the coil of the electromagnet 22, thereby giving rise to an attractive electromagnetic force that pulls the contact surface 14 of the output shaft 6 away from the contact surface 12 of the input shaft 4.

The controller 24 also monitors the relative phases of the signals from the rotation sensors 30, 32. When the rotation speed of the input shaft 4 is equal to the rotation speed of the output shaft 6, the relative phase between the signals from their respective rotation sensors 30, 32 will remain constant. However, if the relative phase changes, or changes over time (i.e. there is a phase drift), this may indicate slipping. If the time difference between 'rising fronts' and/or 'decreasing fronts' of the signals from the rotation sensors 30, 32 varies over time, the controller 24 may determine that slipping is occurring and supply the activation current to the coil of the electromagnet 22 as outlined above.

The controller is therefore arranged to selectively supply the activation current to the coil of the electromagnet 22 such that the input and output shafts 4, 6 are operated in the disengaged position as shown in FIG. 1 when slipping is detected. If the difference does not exceed the threshold, the activation current is not supplied, and thus the biasing force from the Belleville washer 18 retains the clutch in the engaged position as shown in FIG. 2.

In the example described above, power is transmitted due to a frictional contact between the opposing faces of the contact surfaces on the input and output shafts. However, as described previously, a ball-and-ramp interface may be provided to improve mechanical engagement between these surfaces, as shown in FIGS. 4A-C. Many of the features of this arrangement are similar to those described above, where like reference numerals appended with a prime symbol (') indicate like components.

In this arrangement, each contact surface 12', 14' is provided with a respective groove 34, 36. Rotating members (e.g. ball bearings or rollers) are held in a 'cage' as shown in FIGS. 4A and 4C. In this example, the rotating members are ball bearings 38. These rotating members provide a mechanical interface between the contact surfaces 12', 14' in the engaged position as they sit between the grooves 34, 36 of the contact surfaces 12', 14'. These ball bearings 38 provide for a rotating contact, rather than a sliding contact. In general, there may be a number of rotating members in the interface, and these may all be provided on one contact surface 12', 14', or each may have one or more.

Figure 5:
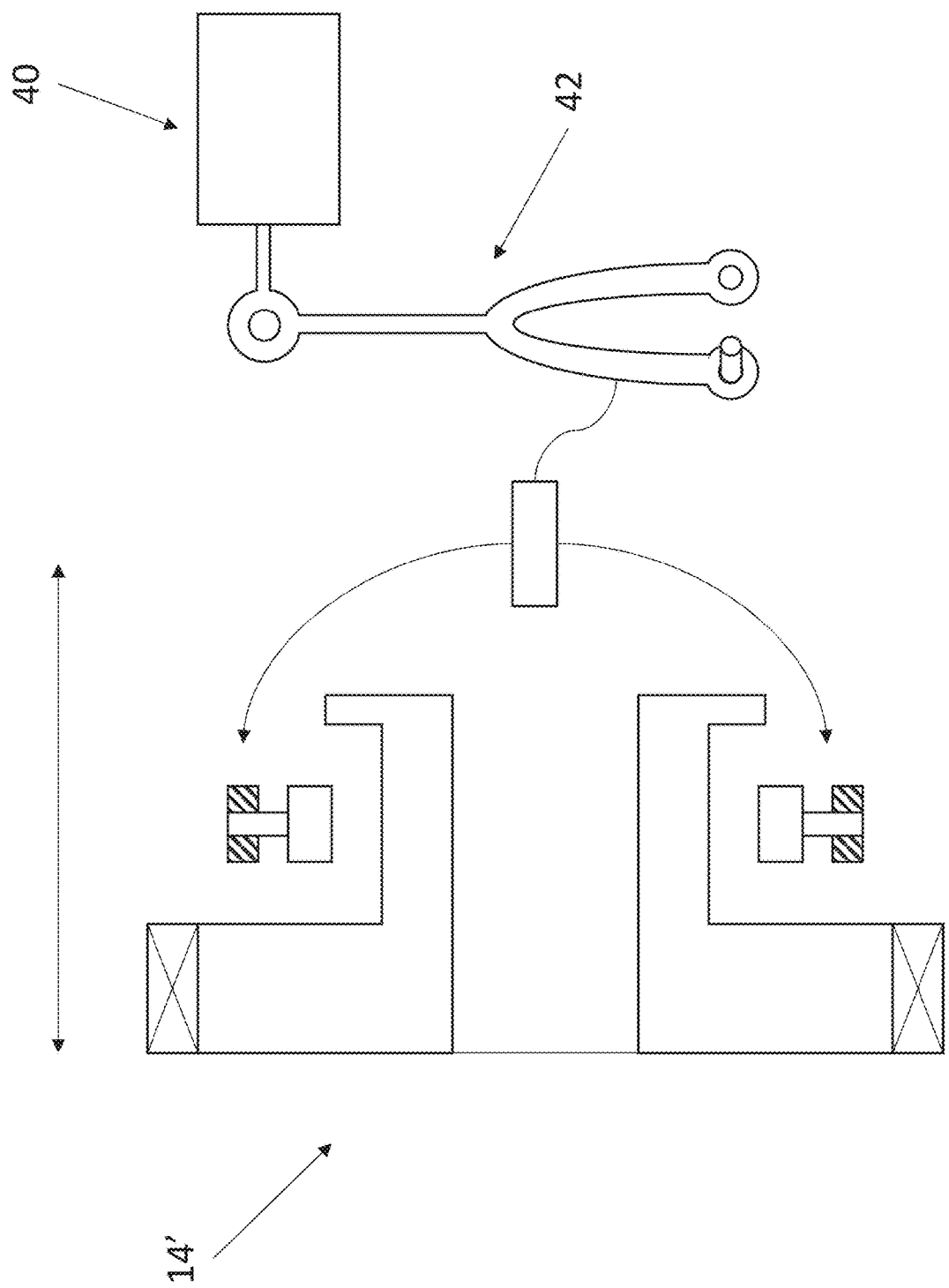
FIG. 5 is a schematic diagram of a yoke-and-solenoid arrangement.

This ball-and-ramp arrangement may make use of a yoke-and-solenoid arrangement, an example of which is shown in FIG. 5. In this example, the electromagnet 22 of FIG. 1 is replaced with a yoke-and-solenoid, where a solenoid 40 (a type of electromagnet) drives motion of a yoke 42, which in turn pulls the contact surface 14' into the disengaged position when excessive torque is detected as outlined above. This may be advantageous when motion of more than a couple of millimetres is required (i.e. for the grooves 34, 36 to sufficiently 'clear' the space occupied by the ball bearings 38) in order for the contact surfaces 12', 14' to mechanically disengage. It will be appreciated that greater motion under the influence of an electromagnet alone is possible, but will require a more powerful electromagnet. Alternative examples are envisioned in which a linear motor could be used in place of the solenoid.

While specific examples of the disclosure have been described in detail, it will be appreciated by those skilled in the art that the examples described in detail are not limiting on the scope of the disclosure.

The invention claimed is:

1. A torque limiter device comprising:
   an input shaft arranged to be driven by an externally applied torque such that it rotates around a first axis, said input shaft comprising a first contact surface;
   an output shaft rotatable around a second axis, wherein the second axis is substantially coaxial with the first axis, said output shaft comprising a second contact surface that faces the first contact surface, and wherein the input and output shafts are operable in an engaged position wherein the first and second contact surfaces are brought into mechanical engagement, and a disengaged position wherein the first and second contact surfaces are separated;
   a biasing mechanism arranged to provide a bias force that biases the input and output shafts in one of the positions;
   an electromagnet arranged to provide an electromagnetic force that opposes said bias force when an activation current is passed through a coil of said electromagnet, thereby operating the input and output shafts in the other of said positions;
   a rotation sensor arrangement arranged to measure a rotation of the input shaft and a rotation of the output shaft; and
   a controller arranged to determine a difference between the rotation of the input shaft and the rotation of the output shaft, said controller being further arranged to selectively supply the activation current to the coil of the electromagnet such that the input and output shafts are operated in the disengaged position when the difference exceeds a threshold.

2. The torque limiter device as claimed in claim 1, wherein the first and second contact surfaces are brought into direct contact in the engaged position.

3. The torque limiter device as claimed in claim 1, wherein the torque limiter device further comprises a friction plate having first and second friction plate surfaces on opposite sides thereof, wherein the first and second contact surfaces are brought into contact with the first and second friction plate surfaces respectively in the engaged position.

4. The torque limiter device as claimed in claim 1, wherein at least one of the contact surfaces is moveable along the axis of its respective shaft, thereby providing movement between the engaged and disengaged positions.

5. The torque limiter device as claimed in claim 4, wherein the second contact surface is axially moveable along the second axis, thereby providing movement between the engaged and disengaged positions.

6. The torque limiter device as claimed in claim 1, wherein the biasing mechanism comprises a resilient member, wherein the bias force is supplied by said resilient member.

7. The torque limiter device as claimed in claim 6, wherein the resilient member comprises a spring.

8. The torque limiter device as claimed in claim 7, wherein the spring comprises a Belleville washer.

9. The torque limiter device as claimed in claim 1, wherein the bias force biases the input and output shafts to the engaged position, wherein the electromagnetic force that opposes the bias force when an activation current is passed through the coil of said electromagnet operates the input and output shafts in the disengaged position.

10. The torque limiter device as claimed in claim 1, wherein the rotation sensor is arranged to determine a difference between a rotation frequency of the input shaft and a rotation frequency of the output shaft.

11. The torque limiter device as claimed in claim 1, wherein the rotation sensor is arranged to determine a difference between a rotation phase of the input shaft and a rotation phase of the output shaft.

12. The torque limiter device as claimed in claim 11, wherein the rotation sensor is arranged to determine a rate of change of said difference.

13. The torque limiter device as claimed in claim 1, wherein at least one of the input and output shafts comprises a toothed arrangement, wherein the rotation sensor detects a motion of the toothed arrangement to determine the rotation of the shaft.

14. The torque limiter device as claimed in claim 13, wherein the rotation sensor comprises a Hall effect sensor arranged to determine the rotation of the toothed arrangement.

15. The torque limiter device as claimed in claim 13, wherein the input and output shafts each comprise a respective toothed arrangement.

16. A thrust reversal actuation system or high-lift system comprising the torque limiter device as claimed in claim 1.

17. The torque limiter device as claimed in claim 1 wherein the controller is arranged to apply the activation current such that the bias force retains the input and output shafts in the engaged position if the difference does not exceed the threshold.

18. A method of operating a torque limiter device, the method comprising:
   monitoring a difference in rotation between an input shaft and an output shaft;
   selectively supplying current to an electromagnet, thereby moving one of the input shaft and the output shafts relative to the other against a biasing force;
   determining when the difference in rotation exceeds a threshold; and
   disengaging the input shaft from the output shaft when the difference in rotation exceeds the threshold.

19. The method of claim 18, wherein the input and output shafts are retained in an engaged position with the biasing force if the difference does not exceed the threshold.

* * * * *